UNITED STATES PATENT OFFICE.

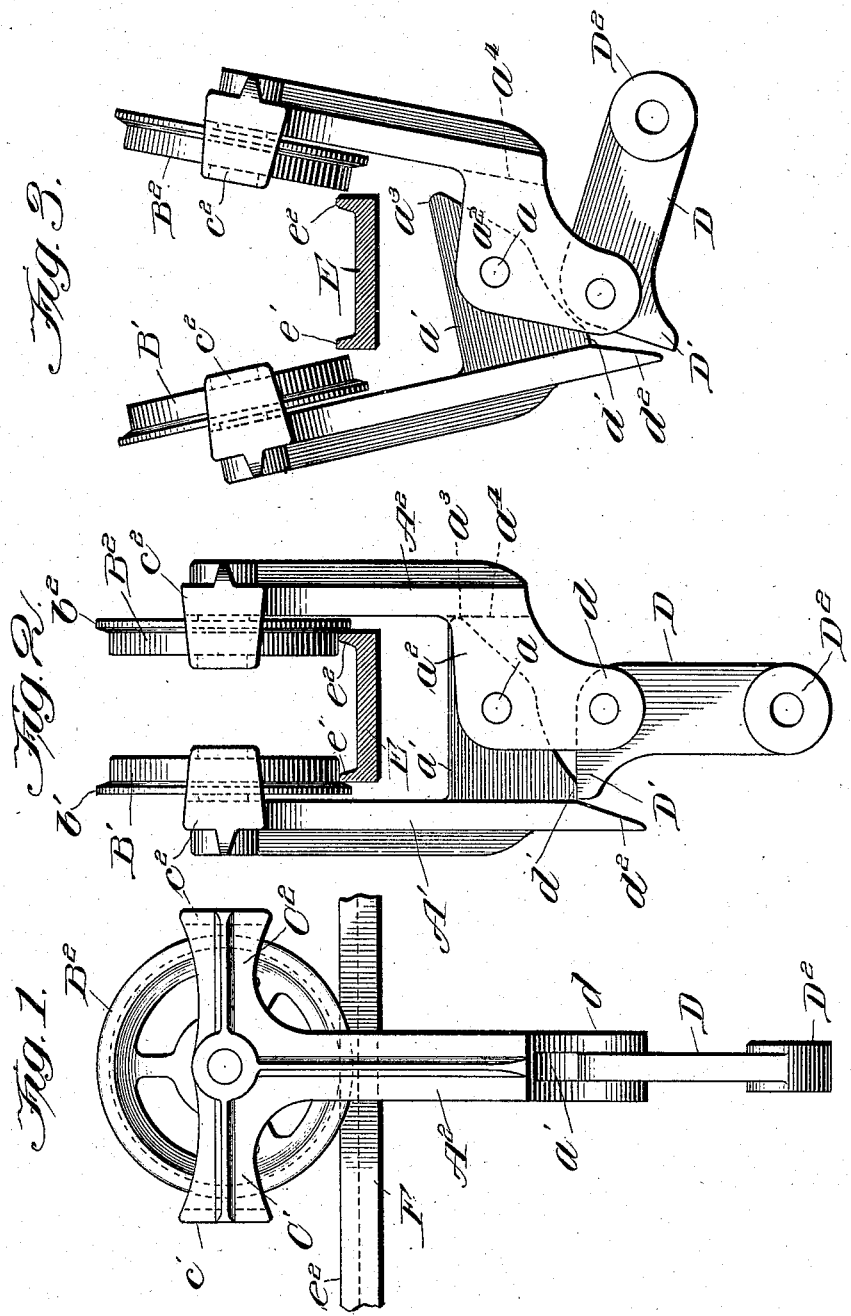

ROSS J. ELLSWORTH, OF CHICAGO, ILLINOIS.

DETACHABLE CONVEYING-TROLLEY.

No. 911,221.  Specification of Letters Patent.  Patented Feb. 2, 1909.

Application filed January 24, 1907. Serial No. 353,796.

*To all whom it may concern:*

Be it known that I, ROSS J. ELLSWORTH, a citizen of the United States, residing at Chicago, county of Cook, State of Illinois, have invented a certain new and useful Improvement in Detachable Conveying-Trolleys, and declare the following to be a full, clear, and exact description of the same, such as will enable others skilled in the art to which it pertains to make and use the same, reference being had to the accompanying drawings, which form a part of this specification.

My invention relates in general to conveying apparatus and more particularly to trolleys adapted to travel upon overhead tracks while supporting loads.

It is necessary that conveying trolleys should securely engage the tracks upon which they travel and at the same time it is desirable that they should be capable of being removed from or applied to their supporting tracks at any desired point.

The primary object of my invention is to provide an improved trolley which may be readily disengaged from or engaged with a supporting track at any point, and which will be securely retained upon the track when in engagement therewith, whether supporting loads or not.

A further object of my invention is to provide a conveying trolley which will be simple in construction, inexpensive in manufacture, and efficient in use.

My invention may be generally described as comprising two members pivotally united between their ends, wheels journaled upon the upper ends of the members and adapted to overlie a track, a cam pivoted upon one member below its pivotal connection with the other member and adapted to engage said other member and thereby prevent the upper ends of the members from separating so that the wheels thereon will be retained above the track.

My invention will be more fully described hereinafter with reference to the accompanying drawings in which the same is illustrated as embodied in a convenient and practical form, and in which—

Figure 1 is a side elevational view of my improved trolley supported upon a track; Fig. 2 a transverse sectional view showing the trolley engaging the track; and Fig. 3 a view similar to Fig. 2 showing the trolley disengaged from the track.

The same reference characters are used to designate the same parts in the several figures of the drawing.

Reference characters $A'$ and $A^2$ designate two members pivotally connected intermediate of their ends by any suitable means, as for instance by a rivet $a$ extending through alined holes in over-lapping inwardly extending portions $a'$ and $a^2$ of the respective members.

Upon the inner surfaces of the upper ends of the pivotally connected members $A'$ and $A^2$ are journaled trolley wheels $B'$ and $B^2$. Each of the members $A'$ and $A^2$, is provided with laterally projecting brackets $C'$ and $C^2$ extending in opposite directions from the bearing of the trolley wheel. The outer ends of such brackets are provided with bumpers $c'$ and $c^2$ which extend on opposite sides of the trolley wheel to protect the same from contact with the wheels of other trolleys supported upon the same track.

E designates a track upon which the trolley wheels are adapted to travel. Such track may conveniently be in the form of a channel beam the side flanges $e'$ and $e^2$ of which project upwardly and are engaged by the treads of the trolley wheels. The trolley wheels are provided with flanges $b'$ and $b^2$ which extend below the outer surfaces of the flanges $e'$ and $e^2$ and thereby securely retain the trolley wheels upon the track.

D designates a cam pivotally connected to a bracket $d$ projecting downwardly from the member $A^2$ below its point of pivotal connection with the other member. The portion $D'$ of the cam is adapted to engage a shoulder $d'$ on the inner surface of the member $A'$ and thereby retain the upper ends of the members in such relative positions that the trolley wheels will over-lie the side flanges of the supporting track. The surface of the shoulder $d'$ engaged by the portion $D'$ of the cam is above the horizontal plane through the pivotal support of the cam so that any tendency of the trolley wheels to separate will be effectively resisted by the cam interposed between the members below their pivotal point of connection. An inclined surface $d^2$ is provided upon the member $A'$ extending downwardly and outwardly from the shoulder $d'$ which is engaged by the upper surface of the portion $D'$ of the cam when the members are swung from the separated position shown in Fig. 3 to the closed position shown in Fig. 2.

The portion $a'$ of the member $A'$ is interposed between two portions $a^2$ projecting inwardly from the opposite members and is provided with an inclined projection $a^3$ adapted to engage an inclined surface $a^4$ on the member $A^2$ when the members are in the position shown in Fig. 2, thereby limiting the inward movement of the upper ends of the members so that the trolley wheels will not move together closer than is necessary for them to properly engage the underlying track.

The lower portion $D^2$ of the cam is provided with a hole through which may extend any suitable means for suspending a load. It will be observed that the construction of the cam is such that the weight of the load suspended thereby serves to insure the cam being retained in such position as to prevent the relative movement of the two members thereby avoiding any liability of the separation of the trolley wheels.

From the foregoing description it will be observed that I have invented an improved conveying trolley which may be readily engaged with or disengaged from a supporting track at any point and which when in engagement with the track will be effectively retained thereon.

While I have described more or less precisely the details of construction, I do not wish to be understood as limiting myself thereto, as I contemplate changes in form, the proportion of parts, and the substitution of equivalents, as circumstances may suggest or render expedient without departing from the spitit of my invention.

Having now fully described my invention, what I claim as new and desire to secure by Letters Patent is:

1. In a conveying trolley, the combination with two members pivotally connected intermediate of their ends, of wheels journaled upon the upper ends of said members, a device movably mounted upon the lower end of one of said members for supporting a load and a shoulder on said device for engaging with the lower end of the other member when said device is in load-supporting position so as to hold the lower ends of said members apart.

2. In a conveying trolley, the combination with two members pivotally connected intermediate of their ends, of wheels journaled upon the upper ends of said members, and a cam mounted upon one of said members and adapted to engage the other member to lock said members in position to retain said wheels in engagement with a supporting track.

3. In a conveying trolley, the combination with two members pivotally connected below their upper ends, of wheels journaled upon said members adjacent their upper ends, a cam pivotally secured to one of said members below its pivotal connection with said other member, and a stop on said other member adapted to be engaged by said cam to lock said members in position to retain said wheels in engagement with a supporting track.

4. In a conveying trolley, the combination with two members pivotally united below their upper ends, of wheels journaled upon the inner surfaces of said members adjacent their upper ends, a locking device interposed between said members below their point of pivotal connection and adapted to retain said members in position for said wheels to overlie a supporting track.

5. In a conveying trolley, the combination with two members pivotally united below their upper ends, of wheels journaled upon the inner surfaces of said members adjacent their upper ends, a locking device interposed between said members below their point of pivotal connection and adapted to retain said members in position for said wheels to overlie a supporting track, and means for supporting a load by said locking device.

6. The combination with a supporting track comprising upwardly extending side flanges, of a trolley adapted to detachably engage said track comprising two relatively movable members and trolley wheels journaled upon the upper ends of said members, the treads of said trolley wheels adapted to travel upon the side flanges of said track, and flanges on said trolley wheels overlying the outer surfaces of said flanges.

In testimony whereof, I sign this specification in the presence of two witnesses.

ROSS J. ELLSWORTH.

Witnesses:
GEO. L. WILKINSON,
HARRY S. GAITHER.